(12) United States Patent
Conrad

(10) Patent No.: US 9,892,073 B1
(45) Date of Patent: Feb. 13, 2018

(54) BUS ADDRESSING SYSTEMS AND METHODS USING REPURPOSED BITS

(71) Applicant: Master Lock Company LLC, Oak Creek, WI (US)

(72) Inventor: Nathan L. Conrad, Milwaukee, WI (US)

(73) Assignee: Master Lock Company LLC, Oak Creek, WI (US)

( * ) Notice: Subject to any disclaimer, the term of this patent is extended or adjusted under 35 U.S.C. 154(b) by 193 days.

(21) Appl. No.: 14/874,817

(22) Filed: Oct. 5, 2015

Related U.S. Application Data

(60) Provisional application No. 62/060,159, filed on Oct. 6, 2014.

(51) Int. Cl.
*G06F 13/00* (2006.01)
*G06F 13/366* (2006.01)
*G06F 13/10* (2006.01)
*G06F 13/42* (2006.01)

(52) U.S. Cl.
CPC .......... *G06F 13/366* (2013.01); *G06F 13/102* (2013.01); *G06F 13/42* (2013.01)

(58) Field of Classification Search
CPC ....... G06F 13/366; G06F 13/42; G06F 13/102
See application file for complete search history.

(56) References Cited

U.S. PATENT DOCUMENTS

| | | | |
|---|---|---|---|
| 4,373,181 A * | 2/1983 | Chisholm | ........... G06F 12/0661 710/37 |
| 6,636,100 B1 | 10/2003 | Shingaki | |
| 6,715,001 B1 | 3/2004 | Birns et al. | |
| 6,728,892 B1 | 4/2004 | Silvkoff et al. | |
| 6,747,498 B1 | 6/2004 | Pauletti et al. | |
| 7,523,334 B2 | 4/2009 | Marais et al. | |
| 7,539,888 B2 | 5/2009 | Hu et al. | |
| 7,975,120 B2 | 7/2011 | Sabbatini, Jr. et al. | |
| 9,641,432 B2 * | 5/2017 | Jha | .......................... H04L 45/74 |
| 2004/0122978 A1 | 6/2004 | Bird | |
| 2004/0176877 A1 * | 9/2004 | Hesse | .................... G05B 15/02 700/276 |
| 2006/0088044 A1 | 4/2006 | Hammerl | |

(Continued)

FOREIGN PATENT DOCUMENTS

| CN | 102555951 A | 7/2012 |
|---|---|---|
| CN | 202463741 A | 10/2012 |

(Continued)

OTHER PUBLICATIONS

Loucks, E. M., et al., "Implementation of a Dynamic Address Assignment Protocol in a Local Area Network" Computer networks and ISDN Sys., vol. 11, No. 2, Feb. 1986, pp. 133-146.*

*Primary Examiner* — Jing-Yih Shyu
(74) *Attorney, Agent, or Firm* — Calfee, Halter & Griswold, LLP

(57) ABSTRACT

Systems and methods for dynamically assigning unique identifiers for devices on a bus using repurposed bits. Dynamically assigned unique identifiers can be dynamically assigned bus addresses. Exemplary methods do not require prior knowledge of the presence of devices on the network, accommodate networks with different numbers and types of devices, and allow for a node addresses as small as the number of devices on the network.

19 Claims, 7 Drawing Sheets

(56) References Cited

U.S. PATENT DOCUMENTS

| | | | |
|---|---|---|---|
| 2006/0095146 A1* | 5/2006 | Hesse | G05B 15/02 700/19 |
| 2008/0162860 A1 | 7/2008 | Sabbatini et al. | |
| 2010/0082805 A1 | 4/2010 | Orton et al. | |
| 2010/0306457 A1 | 12/2010 | Wilson et al. | |
| 2011/0007759 A1 | 1/2011 | Dawson et al. | |
| 2013/0322462 A1* | 12/2013 | Poulsen | H04J 3/06 370/458 |
| 2014/0336821 A1* | 11/2014 | Blaine | A61H 33/005 700/275 |
| 2015/0256384 A1* | 9/2015 | Van Den Hurk | H04L 61/2038 709/220 |
| 2015/0281871 A1* | 10/2015 | Poulsen | H04W 4/005 370/328 |

FOREIGN PATENT DOCUMENTS

| | | |
|---|---|---|
| CN | 102777367 A | 11/2012 |
| CN | 103019218 A | 4/2013 |
| CN | 202863338 U | 4/2013 |
| CN | 202870618 U | 4/2013 |
| WO | 2013086363 A2 | 6/2013 |

\* cited by examiner

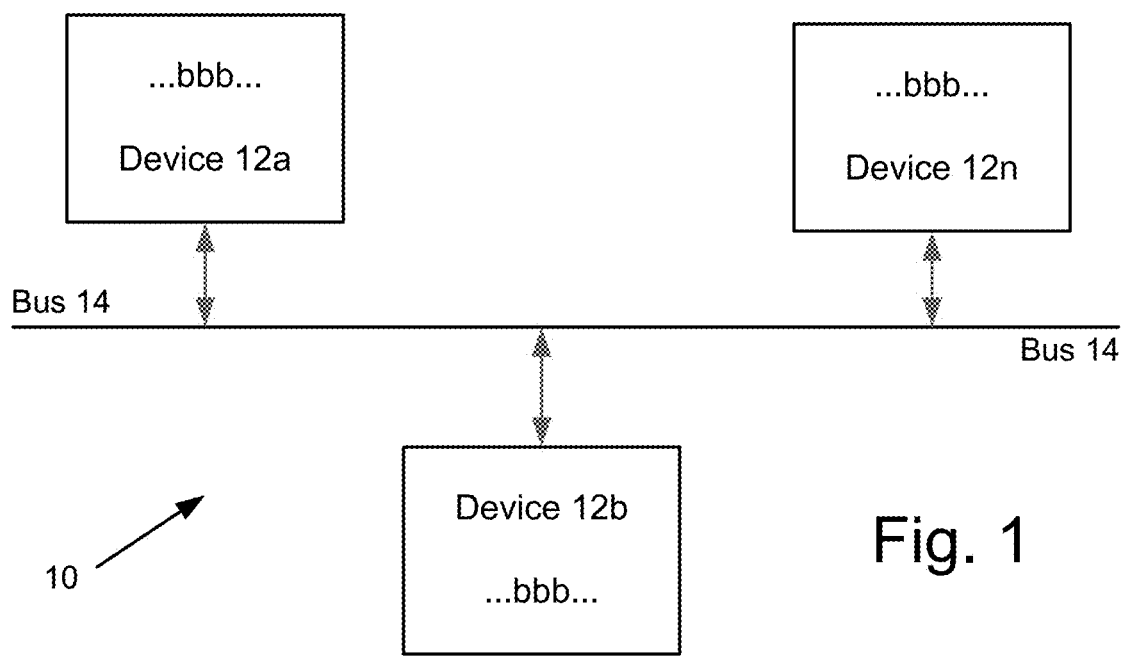
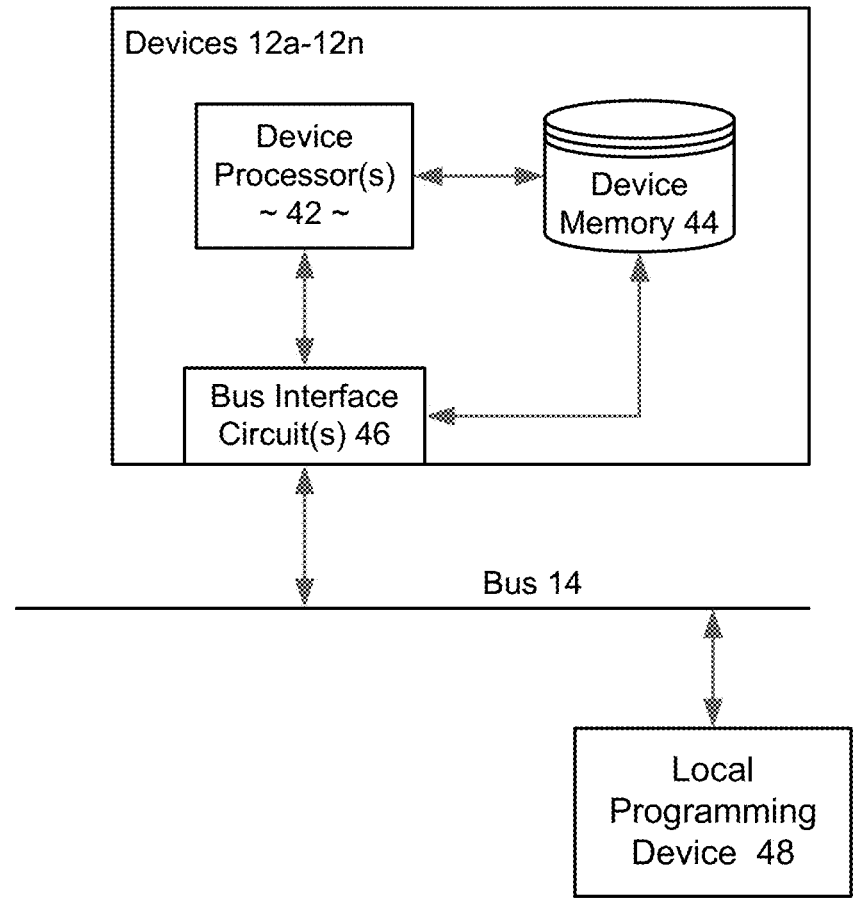

BUS ADDRESSING SYSTEMS AND METHODS USING REPURPOSED BITS

CROSS REFERENCE TO RELATED APPLICATIONS

This application claims priority to and the benefit of U.S. Provisional Patent Application Ser. No. 62/060,159, entitled "BUS ADDRESSING SYSTEMS AND METHODS" and filed Oct. 6, 2014, the entire disclosure of which is incorporated herein by reference.

BACKGROUND

The present disclosure generally relates to the field of communication between devices on a bus. The present disclosure relates more specifically to systems and methods of dynamic addressing of devices communicating on a bus.

A bus is a communications medium carrying data and control signals within a system to which devices can be connected for communications on the bus, such as a distinct set of electrical conductors carrying data and control signals within a system, to which electrical devices can be connected (e.g., connected in parallel) for communications on the bus.

An exemplary bus is the controller area network ("CAN") bus, which was originally designed as a bus for multiple processors in a vehicle to communicate with each other without a host computer and is now also used in various other applications, areas such as aerospace, maritime, industrial automation, and medical equipment. CAN bus is a serial, electrical bus having a message-based protocol. Devices communicating on a CAN bus are called "nodes." Any node attached to the CAN bus can communicate with any other node attached to that CAN bus. An exemplary CAN bus message includes: Start of frame (SOF), Message Identifier (MID or "message ID," which indicates the priority of the message and is used for self-arbitration of simultaneously commenced messages on the CAN bus; the lower the MID value the higher the priority of the message), Remote Transmission Request (RTR), Control field (CONTROL, which specifies the number of bytes of data to follow (0-8)), Data Field (DATA) length 0 to 8 bytes, CRC (field containing a fifteen bit cyclic redundancy check code), Acknowledge Field (ACK), and End of Frame (EOF). Sometimes the MID and RTR are referred to as the "Arbitration Field." CAN 2.0A has an 11-bit message ID and CAN 2.0B has both 11-bit "standard" and 29-bit bit "extended" message IDs. A "standard" message has an arbitration field consisting of 11 message ID bits and an RTR field. For "standard" messages, an IDE field following the RTR field indicates the message is not "extended." An "extended" message has an arbitration field of 11 message ID bits, a Substitute Remote Request (SRR) field, an IDE field which indicates an "extended" message, 18 message ID bits, and an RTR field.

Data on the CAN bus is transmitted using dominant and recessive bus bits or states. When a dominant state is set by one node and a recessive state set by another, the bus reflects the dominant state. When multiple nodes begin transmitting at the same time, each of the nodes begin to transmit their identifier field and stop transmitting their message if they detect a dominant state when they attempted to transmit a recessive state, thereby giving priority to the identifier with the first dominant bit. Because of this arbitration system, it is critical that multiple nodes do not attempt to send messages with the same identifier at the same time. To meet this requirement, it is common for devices to have a manually assigned field in the MID, called the node address.

SUMMARY

The present application discloses systems and methods for dynamically assigning unique identifiers for devices on a bus. The unique identifiers can be addresses. An exemplary method does not require prior knowledge of the presence of devices on the network, accommodates networks with different numbers and types of devices, and allows for a node addresses as small as the number of devices on the network.

An exemplary processor-based device comprises: a processor in communication with a plurality of other devices on a bus, the bus having a protocol using a plurality of bus bits used in accordance with the protocol for a defined purpose; and wherein the processor is programmed to: transmit a discovery mode message on the bus to cause the other devices on the bus to cease independent transmissions on the bus during a discovery mode; automatically identify at least a subset of the other devices on the bus while in the discovery mode; automatically assign to each of the identified other devices on the bus a dynamically-assigned unique identifier using fewer bits than the number of bus bits, to be used by the identified other devices to replace a subset of the bus bits, thereby permitting the rest of the bus bits to be used by the identified other devices for a purpose other than for the defined purpose; and automatically transmit at least one assignment message on the bus transmitting to each of the identified other devices on the bus its respective dynamically-assigned unique identifier to use as dynamically-assigned transmitter identity bits in place of some of the bus bits.

An exemplary method comprises: transmitting a discovery mode message on a bus to cause a plurality of devices on a bus to cease independent transmissions on the bus during a discovery mode, the bus having a protocol using a plurality of bus bits used in accordance with the protocol for a defined purpose; automatically identifying at least a subset of the other devices on the bus while in the discovery mode; automatically assigning to each of the identified other devices on the bus a dynamically-assigned unique identifier using fewer bits than the number of bus bits, to be used by the identified other devices to replace a subset of the bus bits, thereby permitting the rest of the bus bits to be used by the identified other devices for a purpose other than for the defined purpose; and automatically transmitting at least one assignment message on the bus transmitting to each of the identified other devices on the bus its respective dynamically-assigned unique identifier to use as dynamically-assigned transmitter identity bits in place of some of the bus bits.

BRIEF DESCRIPTION OF DRAWINGS

FIG. 1 is a schematic block diagram of an exemplary system including dynamically assignment of unique identifiers for devices on a bus.

FIG. 3 is a schematic block diagram of an exemplary device having dynamically assigned unique identifiers.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Referring now to FIG. 1, a block diagram of an exemplary system 10 is shown. System 10 includes a plurality of devices 12a-12n (i.e., 12a, 12b, . . . 12n) directly connected via a bus 14. Devices 12a-12n comprise a processor and a connection to the bus 14. "Processor" or "computer" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), and field programmable gate arrays (FPGAs), etc. Computer devices herein can have any of various configurations, such as handheld computers (e.g., so-called smart phones), pad computers, tablet laptop computers, desktop computers, and other configurations, and including other form factors. In exemplary embodiments, the bus is a CAN bus. In alternate embodiments the bus 14 is some other bus not having dynamically-assigned unique identifiers for devices on the bus. In exemplary embodiments, bus 14 has a protocol using a plurality of bus bits (indicated as "bbb" in devices 12a-12n) used in accordance with the protocol for a defined purpose. If the bus 14 is a CAN bus, the bus bits "bbb" can be the message ID bits used for self-arbitration of potential conflicts as devices 12a-12n begin transmitting a message at the same time.

Figure 2:
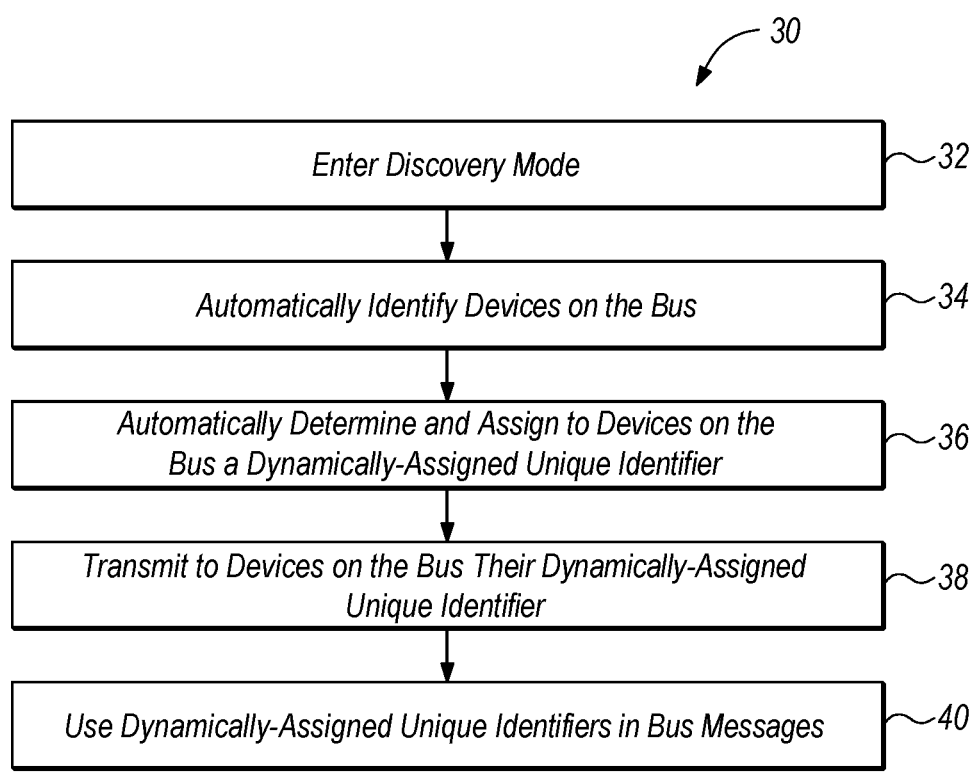
FIG. 2 is a flow chart of an exemplary method.

In exemplary embodiments, unique identifiers for devices 12a-12n on bus 14 are dynamically-assigned, e.g., dynamically assigned addresses for devices 12a-12n. FIG. 2 is a high-level flow chart showing an exemplary method of dynamically assigning unique identifiers for devices 12a-12n on bus 14. At 32, the system 10 enters a discovery mode, in which devices 12a-12n on bus 14 cease independent transmissions on bus 14. In exemplary embodiments, prior to entering the discovery mode, devices 12a-12n were independently transmitting messages on bus 14, e.g., transmitting data and/or requesting that data be transmitted. The system 10 can enter a discovery mode in a number of ways, explained in more detail below. For example, one of the devices 12a can transmit a discovery mode message on the bus 14 to cause the other devices 12b-12n on bus 14 to cease independent transmissions on bus 14 during the discovery mode. As another example, a (e.g., local programming device 48 in FIG. 3) can be temporarily connected to bus 14 to cause the devices 12a-12n to enter the discovery mode. Once in the discovery mode, at 34, the system automatically (i.e., without human intervention) identifies devices on bus 14. In an exemplary embodiment, in response to entering the discovery mode, the devices 12a-12n each transmit a single message identifying themselves to the device that caused the system 10 to enter the discovery mode and, typically, to the other devices on bus 14.

Next, at 36, the system 10 automatically (i.e., without human intervention) determines and assigns to the devices 12a-12n on bus 14 a dynamically-assigned unique identifier. In exemplary embodiments, this will take fewer bits than the bus bits, e.g., in a CAN 2.0 A system, the dynamically-assigned unique identifier will require fewer bits than the 11 message ID bits and, in a CAN 2.0 B system, the dynamically-assigned unique identifier will require fewer bits than the standard 11 message ID bits and fewer bits than the extended 29 message ID bits. In an exemplary system 10 with ten (10) devices 12a-12n, it could take four bits to represent those ten devices: 0000, 0001, 0010, 0011, 0100, 1010, 0110, 0111, 1000, and 1001. Then, at 38, the dynamically-assigned unique identifiers are transmitted to the devices 12a-12n and each device 12a-12n uses its respective dynamically-assigned unique identifier in bus messages, at 40, in place of some of the bus bits "bbb" after the system leaves the discovery mode. The remaining bus bits can be used for different purposes (repurposed bits), e.g., filtering, as explained herein.

FIG. 3 is a schematic block diagram of an exemplary device 12a-12n having dynamically assigned unique identifiers. Exemplary device 12a-12n is shown. The device 12a-12n of FIG. 3 has one or more device processors 42 in communication with a device memory 44 and one or more bus interface circuits 46 for communicating with the bus 14. Device memory 44 includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc.

The device 12a-12n and the devices 12a-12n all have associated logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

FIG. 3 also shows an exemplary local programming device 48, which is temporarily connected to the bus 14 to cause the system 10 to dynamically allocate the unique identifiers. In exemplary embodiments, a person, e.g., an engineer or technician who installed one or more devices 12a-12n will temporarily connect a local programming device 48 to the bus 14 and either does the steps herein or causes one of the devices 12a-12n to do so. Thus, in exemplary embodiments, programming device 48 does the steps of putting the system into discovery mode, automatically identifying devices on the bus 14, automatically determining and assigning to devices on the bus 14 respective dynamically-assigned unique identifier, and transmitting to devices on bus 14 their respective dynamically-assigned unique identifier, and also, in some embodiments, causing the system to leave the discovery mode, permitting devices on bus 14 to use their dynamically-assigned unique identifiers in bus messages in place of some of the bus bits, and, optionally, other associated steps, e.g., causing the system to leave discovery mode and resume communications using the dynamically-assigned unique identifiers. In other exemplary embodiments, local programming device 48 causes another device to do the steps of putting the system into discovery mode, automatically identifying devices on the bus 14, automatically determining and assigning to devices on the bus 14 respective dynamically-assigned unique identifier, and transmitting to devices on bus 14 their respective dynamically-assigned unique identifier, and also, in some embodiments, causing the system to leave the discovery mode, permitting devices on bus 14 to use their dynamically-assigned unique identifiers in bus messages in place of some of the bus bits. In the alternative to a device causing the system to leave the discovery mode, e.g., by transmitting an end discovery mode message, or in addition thereto (to prevent system lockup), all the devices on the bus 14 can automatically leave the discovery mode a length of time (e.g., a predetermined time or selected number of bus transmission cycles) after a trigger, such as a length of time from the "Tx Identity Msg" event, as in FIG. 7B, or a length of time from one of multiple other points, and still be effective.

In exemplary embodiments, one device normally connected to the bus 14 (referred to herein as a control unit) puts the system into discovery mode, automatically identifies devices on the bus 14, automatically determines and assigns to devices on the bus 14 respective dynamically-assigned unique identifier, and transmits to devices on bus 14 their respective dynamically-assigned unique identifier, and also, in some embodiments, causes the system to leave the discovery mode, permitting devices on bus 14 to use their dynamically-assigned unique identifiers in bus messages in place of some of the bus bits. The various control units have associated logic for performing the various functions and processes described herein. The control unit can be one of the devices 12a-12n or a different device. For example, when local programming device 48 causes one of the devices 12a-12n to perform the steps herein associated with dynamically-assigned unique identifiers, that device functions as the control unit.

Figure 4:
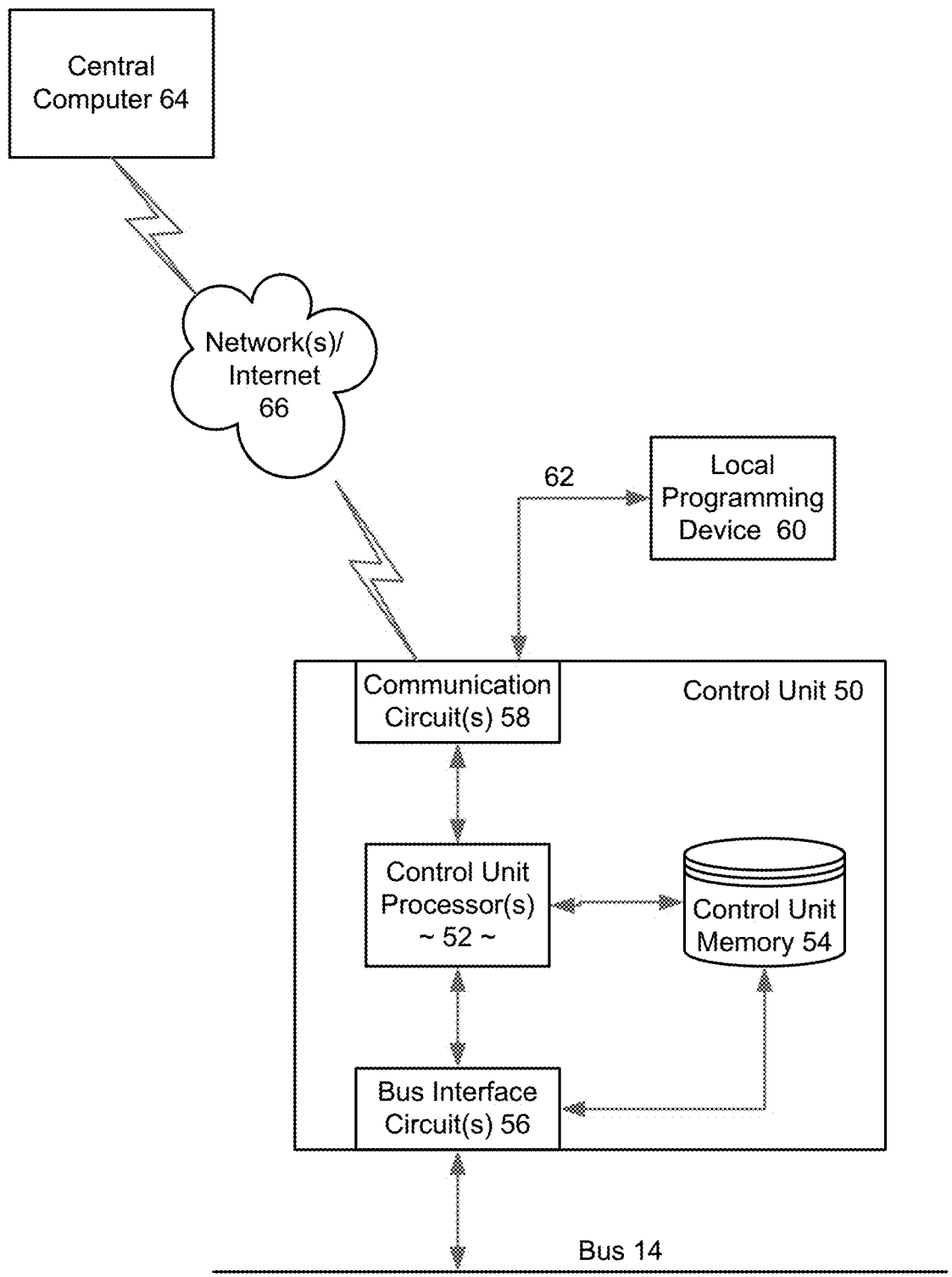
FIG. 4 is a schematic block diagram of an exemplary control unit for dynamically assigning unique identifiers for devices on a bus.

Referring now to FIG. 4, an exemplary control unit 50 is shown. The control unit 50 has one or more processors 52 in communication with a control unit memory 54 and one or more bus interface circuits 56 for communicating with the bus 14. Control unit memory 54 includes one or more non-transitory computer readable media of one or more local or remote data storage devices. The control unit 50 has associated logic for performing the various functions and processes described herein associated with dynamically-assigned unique identifiers. In exemplary embodiments, control unit memory 54 has stored thereon code causing the control unit 50 to perform the various steps and processes herein.

In exemplary embodiments, control unit 50 also comprises one or more communication circuits 58, which include antennas and/or data ports and driver chips for sending and receiving communications with devices external to the control unit 50. Communication circuits 58 can include any one or more of Ethernet ports and circuitry, WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth antenna and circuitry, and other antennas, ports, and circuitry. In exemplary embodiments, some or all of the devices 12a-12n also have such communication circuit(s).

In exemplary embodiments, an engineer or technician connects a local programming device 60 to the control unit 50 via wired or wireless communications medium 62 and uses the local programming device 60 to cause the control unit 50 to perform the steps of putting the system into discovery mode, automatically identifying devices on the bus 14, automatically determining and assigning to devices on the bus 14 respective dynamically-assigned unique identifier, and transmitting to devices on bus 14 their respective dynamically-assigned unique identifier, and also, in some embodiments, causing the system to leave the discovery mode, permitting devices on bus 14 to use their dynamically-assigned unique identifiers in bus messages in place of some of the bus bits. In other exemplary embodiments, control unit 50 is remote (e.g., out in the field) and communicates with a central computer 64 via one or more wired or wireless communication networks 66, e.g., the Internet, and the central computer 64 causes the control unit 50 to perform the steps of putting the system into discovery mode, automatically identifying devices on the bus 14, automatically determining and assigning to devices on the bus 14 respective dynamically-assigned unique identifier, and transmitting to devices on bus 14 their respective dynamically-assigned unique identifier, and also, in some embodiments, causing the system to leave the discovery mode, permitting devices on bus 14 to use their dynamically-assigned unique identifiers in bus messages in place of some of the bus bits.

Figure 5:
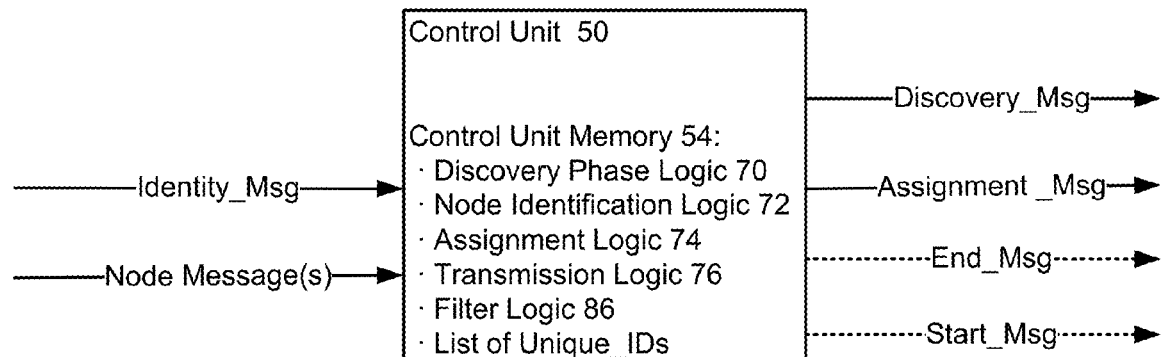
FIGS. 5 and 6 are schematic flow diagrams showing various inputs and outputs for an exemplary control unit and exemplary devices on a bus.
Figure 6:
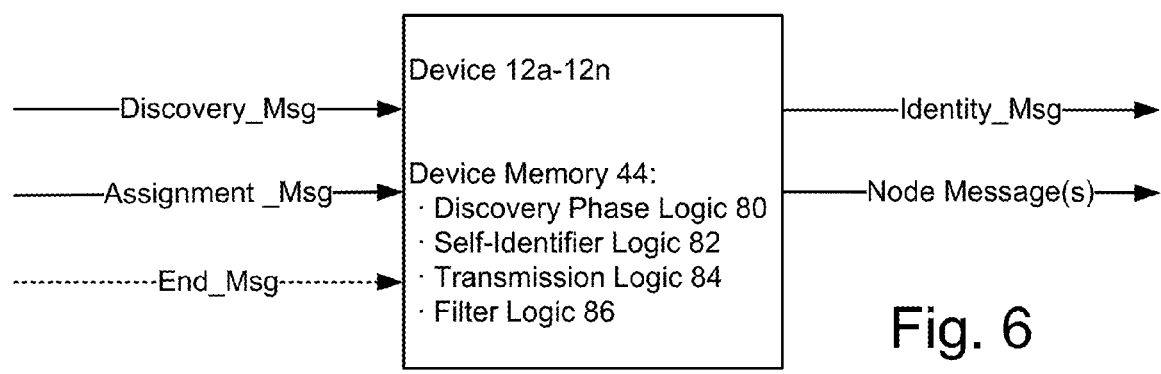

FIGS. 5 and 6 are schematic flow diagrams showing various inputs and outputs for an exemplary control unit 50 and exemplary devices 12a-12n on a bus. Exemplary control unit 50 has discovery mode logic 70, node identification logic 72, assignment logic 74, and transmission logic 76. In exemplary embodiments, these comprise code stored in control unit memory 54 that cause the control unit processor(s) 52 to do the various functions described herein. Exemplary devices 12a-12n have discovery mode logic 80, self-identifier logic 82, and transmission logic 84, and, in some exemplary embodiments, filter logic 86. In exemplary embodiments, these comprise code stored in device memory 44 that cause the device processor(s) 42 to do the various functions described herein. Transmission logic 76, 84 transmit messages on bus 14 and receive messages from bus 14 for the control unit 50 and the devices 12a-12n, respectively.

Figure 7A:
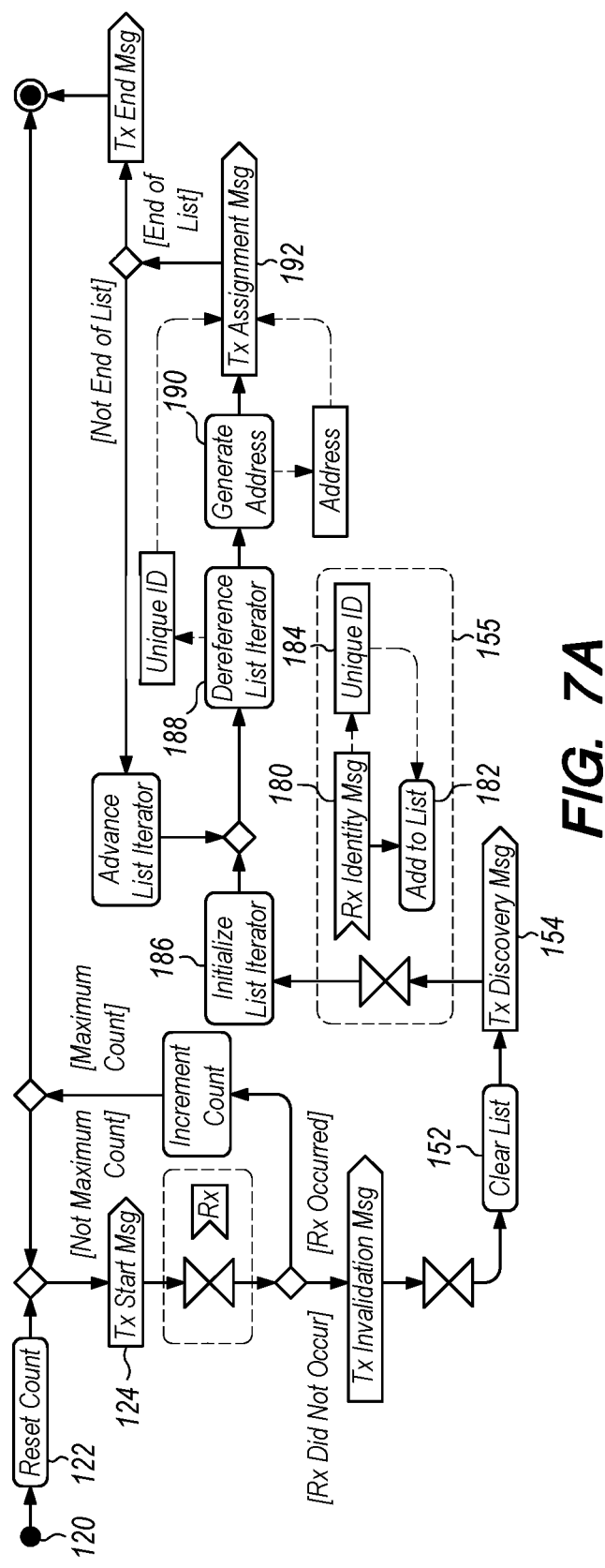
FIGS. 7A-7B are a medium-level schematic flow diagrams showing an exemplary implementation of dynamically assigning unique identifiers to devices on a bus.

Discovery mode logic 70 causes the control unit 50 to determine when to enter the discovery mode, e.g., in response to receiving a command from local programming device 48, 60 or from central computer 64. Prior to entering the discovery mode, devices 12a-12n are independently transmitting messages on bus 14, e.g., transmitting data and/or requesting that data be transmitted. A number of different conditions can trigger the control unit 50 to cause the system to enter the discovery mode, such as: receiving an initiate identifier assignment message from local programming device 48; receiving an initiate identifier assignment message from local programming device 60; receiving an initiate identifier assignment message from central computer 64; one of the devices 12a-12n sending a message on the bus indicating that it detected a conflicting transmission on bus 14, which indicates that not all of the devices on the bus have a unique identifier; and automatically on power-up (or automatically only on the first power-up) of the control unit 50 if the control unit 50 is the only device on the bus 14 capable of dynamically assigning unique identifiers to devices on bus 14. When one of these conditions is met, discovery mode logic 70 causes the control unit processor 52 to send a message (e.g., Discovery_Msg in FIGS. 5-7) to all devices on the bus 14 causing them to begin the discovery mode, as shown in FIG. 5. The example of FIG. 7A provides additional detail and clarifies that although the conditions are initiating a sequence of events with the hopes of entering discovery mode, the transition to discovery mode will not always be successful. For example, in FIG. 7A those conditions may cause that entire flow chart to trigger, but first it uses the Start Msg 124 and Invalidation Msg to ensure nodes are in a particular state before sending Discovery Msg at point 154. In the example of FIG. 7A, it is possible that although the conditions triggered execution, the flow could end without ever sending the Discovery Msg or devices entering discovery mode.

As shown in FIG. 6, this begin discovery mode message is received by devices 12a-12n on the bus 14, causing them to begin the discovery mode. Prior to entering the discovery mode, devices 12a-12n are independently transmitting messages on bus 14, e.g., transmitting data and/or requesting that data be transmitted. In response to receiving the begin discovery mode message, the discovery mode logic 80 causes the devices 12a-12n on bus 14 cease independent transmissions on bus 14 immediately, or after receipt of another bus message (not shown), or a predetermined or selected period of time after receiving the begin discovery mode message. In the discovery mode, the devices indicate their presence on the bus 14 by transmitting on the bus a message (e.g., Identity_Msg in FIGS. 5-7). In the exemplary system of FIGS. 7A-7B, each device has a "Unique ID" or Unique_ID, which is an identifier which is unique for any device which could possibly be attached to the system (typically a larger population than those actually attached to the system). A device's Unique ID is different from the assigned unique identifier according to the present application (e.g., an assigned address), which is unique with respect to the devices actually attached to the system. In this exemplary embodiment, the "Unique ID" is used in both the "Tx Identity Msg" and "Tx Assignment Msgs" to identify devices and, in the exemplary system, is also used as the arbitration field for those messages.

Accordingly, in exemplary embodiments, the Identity_Msg has the following format: at least the Unique_ID plus perhaps other data, e.g., hardware type. In exemplary embodiments, each of the devices 12a-12n on the bus 14 allows its node address in the bus bit range to be configured by the control unit 50, called a "Dynamic Node." In other exemplary embodiments, some of the devices 12a-12n on the bus 14 might already have a static address in the bus bit range, i.e., some devices do not allow their node addresses to be configured by the control unit, called a "Static Nodes." In exemplary embodiments, Devices 12a-12n that are Static Nodes do not respond to the control unit 50. Such nodes are programmed as static nodes and do not respond. Looking at FIGS. 7A-7B, if a node is static, it never sends out the Identify message. In alternative exemplary embodiments, Devices 12a-12n that are Static Nodes will identify themselves to the control unit 50 as Static Nodes.

As shown in FIG. 5, the control unit 50 receives the Identity_Msg from each node (each device 12a-12n). In exemplary embodiments, node identification logic 72 causes the control unit 50 to create a list of the devices on the bus 14 that sent an Identity_Msg, which is stored in control unit memory 54. In other embodiments, other ways of tracking the responding nodes is used, such as setting a flag corresponding to each responding node.

Next, assignment logic 74 causes the control unit 50 to automatically assign a unique identifier, such as an address, to each of the devices 12a-12n on the bus that responded with an Identity_Msg (or a subset thereof) and to keep unchanged the address of each of the devices 12a-12n that are Static Nodes (and any responding nodes that are to keep their previous unique identifier). In exemplary embodiments, if the control unit 50 is to continue to function by sending messages on the bus 14 (e.g., the control unit 50 is ordinarily one of the devices 12a-12n), the control unit 50 will also assign itself a unique identifier. In the alternative, the control unit 50 could also keep its currently assigned value or it could be a Static Node. Optionally, a list of the unique identifiers and corresponding nodes can be automatically generated and stored in control unit memory 54. For the devices 12a-12n that are Static Nodes, assignment logic 74 causes the control unit 50 to keep track of those nodes and their static addresses based on the respective Identity_Msgs and leave their identifier the same; assignment logic 74 causes the control unit 50 to automatically avoid assigning the static address of a Static Node to one of the devices 12a-12n that are Dynamic Nodes. In exemplary embodiments, the assigned unique identifiers will take fewer bits than the number of bus bits, e.g., in a CAN 2.0 A system, the dynamically-assigned unique identifier will require fewer bits than the 11 message ID bits and, in a CAN 2.0 B system, the dynamically-assigned unique identifier will require fewer bits than the 29 message ID bits. In an exemplary system 10 with ten (10) devices 12a-12n, it could take four bits to represent those ten devices: 0000, 0001, 0010, 0011, 0100, 1010, 0110, 0111, 1000, and 1001. Next, the assignment logic 74 communicates via one or more transmissions on bus 14 (Assignment_Msg in FIGS. 5-7) the dynamically-assigned unique identifiers and the device 12a-12n to which each is assigned, using transmission logic 76. The devices 12a-12n receive these Assigmnent_Msgs and store in their respective device memory 44 at least their own dynamically-assigned unique identifiers. In exemplary embodiments, devices 12a-12n store in their respective device memory 44 the list of all (or at least a plurality of) of the dynamically-assigned unique identifiers and the device 12a-12n to which each is assigned.

In exemplary embodiments, discovery mode is exited and the system switches back to normal mode before the dynamically-assigned unique identifiers are assigned to devices 12a-12n. In such embodiments, the discovery mode is relatively short and control unit 50 assigns the dynamically-assigned unique identifiers to devices 12a-12n using messages in normal mode. In alternative embodiments, the system switches back to normal mode after the dynamically-assigned assigned unique identifiers are assigned to devices 12a-12n by control unit 50.

In exemplary embodiments, the trigger to switch back to normal mode is implemented by the control unit 50 sending a message (e.g., the End_Msg in FIGS. 5-7) on bus 14. If dynamically-assigned unique identifiers have already been assigned, that message (or a timeout, discussed below) also triggers each of the devices 12a-12n to begin using its respective dynamically-assigned unique identifier in bus messages in place of some of the bus bits. In other embodiments, or in these embodiments, the passing of a predetermined or selected period of time from entering the discovery mode (or some other reference) can also cause the control unit 50 to send the End_Msg. The devices 12a-12n receive this message and begin using its respective dynamically-assigned unique identifier in bus messages in place of some of the bus bits. If the control unit 50 is to continue to function by sending messages on the bus 14 (e.g., the control unit 50 is ordinarily one of the devices 12a-12n), the control unit 50 will also begin using its respective dynamically-assigned unique identifier in bus messages in place of some of the bus bits. The remaining bus bits (repurposed bits) can be used for other purposes, e.g., filtering. For example, a bus interface circuit can be programmed to power up, awaken, or interrupt its respective processor only when a message addressed to it is received on the bus.

Figure 7B:
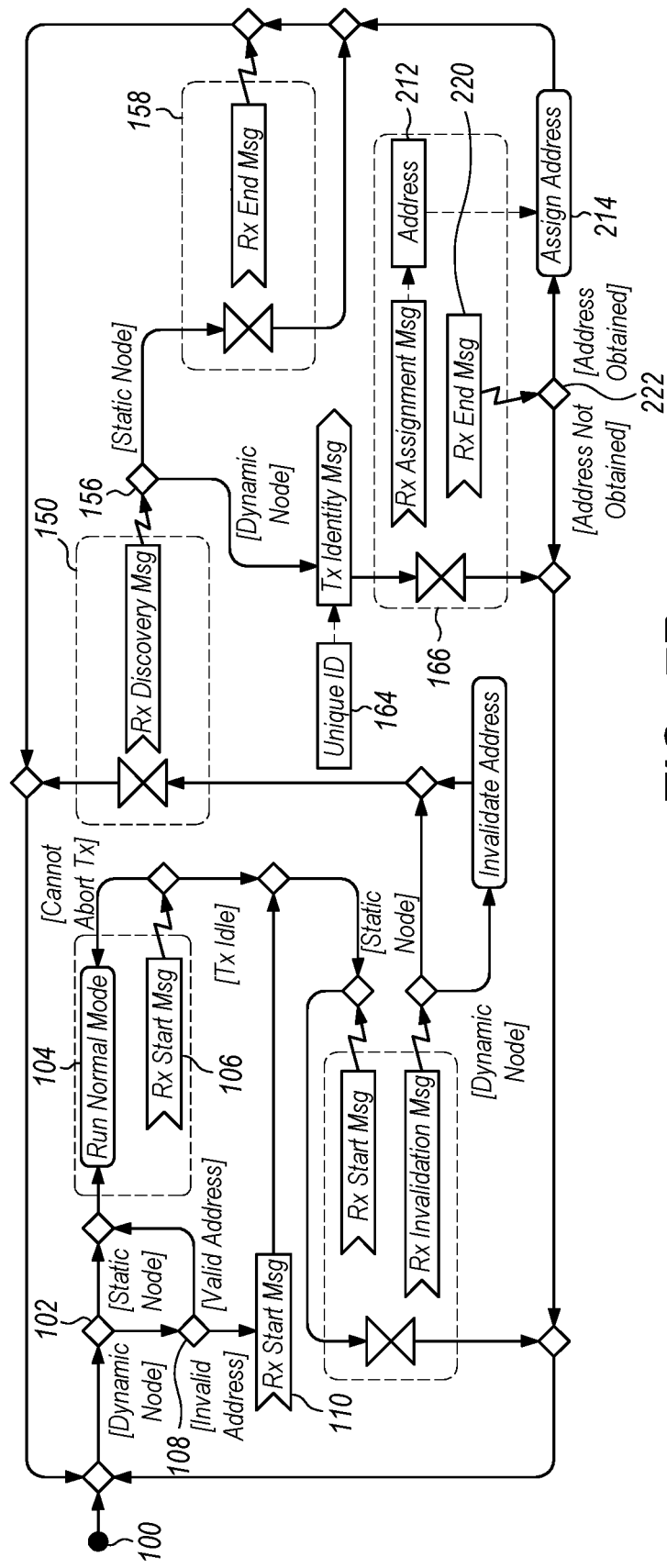

Referring now to FIGS. 7A-7B, these figures are medium-level schematic flow diagrams showing an exemplary implementation of dynamically assigning unique identifiers to devices on bus 14. FIGS. 7A-7B show two flows: one flow in FIG. 7A for a client node (e.g., a control unit 50 on bus 14) and one flow in FIG. 7B for a plurality of server nodes (e.g., a plurality of devices 12a-12n on bus 14). Starting at 100 in FIG. 7B, if a server node is a Static Node, at 102, that server node runs normally (transmits messages on the bus 14, as needed), at 104, until it receives a Start_Msg, at 106. Dynamic Nodes are handled differently. On the one hand, if the server node is a Dynamic Node, at 102, and that has a valid address, at 108, that server node runs normally, at 104, until it receives a Start_Msg, at 106. On the other hand, if the server node is a Dynamic Node, at 102, and that has an invalid address, at 108, that server node remains passive (does not transmit messages on the bus 14, but may receive and act upon bus messages), until it receives a Start_Msg, at 110.

Referring now to FIG. 7A, the client node begins at 120 in response to any of the many triggers for dynamically assigning unique identifiers to devices on bus 14, e.g., in response to receiving a command from local programming device 48, 60 or from central computer 64. Client node first resets its start attempt count, at 122, and transmits a Start_Msg, at 124, which begins the synchronization process by communicating to the nodes that the process of entering the discovery mode is beginning. Nodes implicitly acknowledge the Start_Msg by ceasing transmissions on the bus 14 and entering a wait mode. Some nodes might ignore the Start_Msg by continuing to transmit on the bus 14, e.g., if they are in the process of transmitting a multi-transmission message or other long message on the bus 14. In that case, the client node will wait a period of time and then try again by transmitting another Start_Msg. In exemplary embodiments, prior to entering the discovery mode, the client node causes one or more of the other nodes to erase their dynamic address. In FIG. 7A the client node transmits an Invalidation_Msg to cause all the server nodes with dynamic addresses to invalidate their previously assigned addresses. In other exemplary embodiments, logic permits the client node to cause one or more selected nodes invalidate their previously assigned dynamic addresses by sending invalidation messages addressed to those selected nodes.

Then, at 150, the server nodes wait for a Discovery_Msg from the client node. Meanwhile, the client node at 152 clears its previous list of devices and unique identifiers, if any, transmits a Discovery_Msg on the bus, at 154, and waits at 155 for each of the server nodes to transmit an Identity_Msg. What happens in each server node depends on whether the node is a Static Node or a Dynamic Node. On the one hand, at 156 in FIG. 7B, if a server node is a Static Node, it waits at 158 until it receives an End_Msg. On the other hand, if the server node is a Dynamic Node, at 156, it transmits an Identity_Msg to the client node. If a server node has a Unique ID, it transmits that Unique ID as part of the Identity_Msg, at 164. Then, each Dynamic Node waits at 166 until it receives an Assignment_Msg or an End_Msg from the client node.

Referring back to the client node in FIG. 7A, at 180, in response to receiving an Identity_Msg from one of the server nodes, the client node adds that node to the list of nodes connected to the bus 14 and, if the server node is a dynamic node, the client node generates a new unique identifier for that node as its identifier, at 184, and saves the new unique identifier in the list of nodes and identifiers, at 182. Then, at 186, the client node initializes the list iterator (an iterator is an object that traverses a container, like a list), dereferences the list iterator, at 188 (i.e., accesses an element in the List to get the unique identifier which was added to list by 182), and for each of the nodes in the list (which presumably includes an entry for each dynamic node on the bus 14), the client node generates an address for that node, at 190, and transmits an Assignment_Msg for that node, at 192.

Referring back to the server nodes in FIG. 7B, when each Dynamic Node receives its respective Assignment_Msg, it extracts its new address created by the client node, at 212, and saves that address at 214 for use with transmitting bus messages after leaving the discovery mode.

Referring back to the client node in FIG. 7A, once the client node has transmitted an Assignment_Msg to each of the server nodes, the client node transmits an End_Msg on the bus 14, which ends the discovery mode and causes the server nodes to resume sending messages on the bus 14, using their respective dynamically-assigned unique identifier. Referring back to the server node in FIG. 7B, if a dynamic server node receives an End_Msg, at 220, it checks at 222 to see if it has been assigned an address. If so, it saves that address, at 214, for use with transmitting bus messages after leaving the discovery mode. If the dynamic server node has not obtained a new address, at 222, its code loops back around to the tests at 102 and 108, discussed above.

This method assumes the client is able to use a node address which is not configured by the service when in normal mode to transmit requests. That is, a client cannot transmit a message to initiate a "discovery mode" attempt unless it has the ability to transmit on the "normal mode" bus. This means it needs to assume a normal mode "address" or arbitration ID; or have a static "address"; or use a fixed address for this service; or has a message whose arbitration field is guaranteed to not to collide with any normal message, etc.

The exemplary systems and methods herein have numerous benefits, such as functioning with networks with different numbers and types of devices on the same bus. These can be assembled/installed and then node addresses can be assigned easily and automatically through a single client without an external entity specifying node addresses or needing to know or specify the devices on the bus. Another benefit is that the exemplary systems and methods herein permit the use of node addresses as small as the number of devices on the network which is generally smaller than both the total population of devices and the CAN arbitration ID, allowing the rest of the arbitration ID to be used for other communication purposes, e.g., filtering. This allows for more efficient communications due to less message time, power consumption, and message processing (as the arbitration ID can be used to provide more efficient message filtering). Still another benefit is that the exemplary systems and methods herein allow devices to have their node addresses assigned by this method or other methods (which can lead to Static Nodes) on a device-by-device basis, allowing both simplicity and compatibility with more traditional node address configuration methods.

Referring back to FIGS. 5 and 6, in exemplary embodiments, the devices 12a-12n (and the control unit 50 if it is ordinarily one of the devices 12a-12n) has filter logic 86, which causes the devices 12a-12n (and the control unit 50 if it is ordinarily one of the devices 12a-12n) to filter messages based on either the dynamically-assigned unique identifier and/or the remaining bus bits, e.g., remaining bus bits being used as a recipient address field.

For example, in exemplary embodiments, the filter logic 86 causes one or more of the devices 12a-12n (and perhaps the control unit 50) filter using the dynamically-assigned transmitter identity bits of the other devices in bus messages, e.g., receive at least the dynamically-assigned transmitter identity bits of a bus message, compare the device corresponding to the received dynamically-assigned transmitter identity bits for that message to the at least one device indicator stored in device memory 44 (e.g., other devices which that device receives messages and takes action), and taking a filtering action based on that comparison, e.g., the dynamically-assigned transmitter identity bits indicate a transmitting device that the listening device can ignore, or not. In exemplary CAN bus embodiments, different filter actions are contemplated, such putting a device into low power mode and only wakening or powering up (to conserve power used by) or interrupting (to prevent unnecessary interruption of the current execution of) the device when a message that passes the filter is received, e.g., waking the processor when a message addressed to it was received. Thus, in exemplary embodiments, a processor is not awakened from a low power mode (and the processor is not given any indication that a message was received that does not pass the filter); thus, the processor does not take any action for filtered messages, which saves time as well as power. In other exemplary embodiments, different filter actions are contemplated, e.g., one or more of the following when the transmission on the bus 14 can be ignored: putting some of the circuitry of that device into a lower power mode, putting the processor 42 of that device into a lower power mode, ceasing to receive bits of that message before the end of that message; and/or putting a bus transceiver circuit 46 for that device into a lower power mode. In these examples, the device with some of its circuitry in lower-power mode will, at some point, put that circuitry back in its normal operating mode, which consumes more power than the lower-power mode, e.g., at the start of the next bus message.

Figure 8:
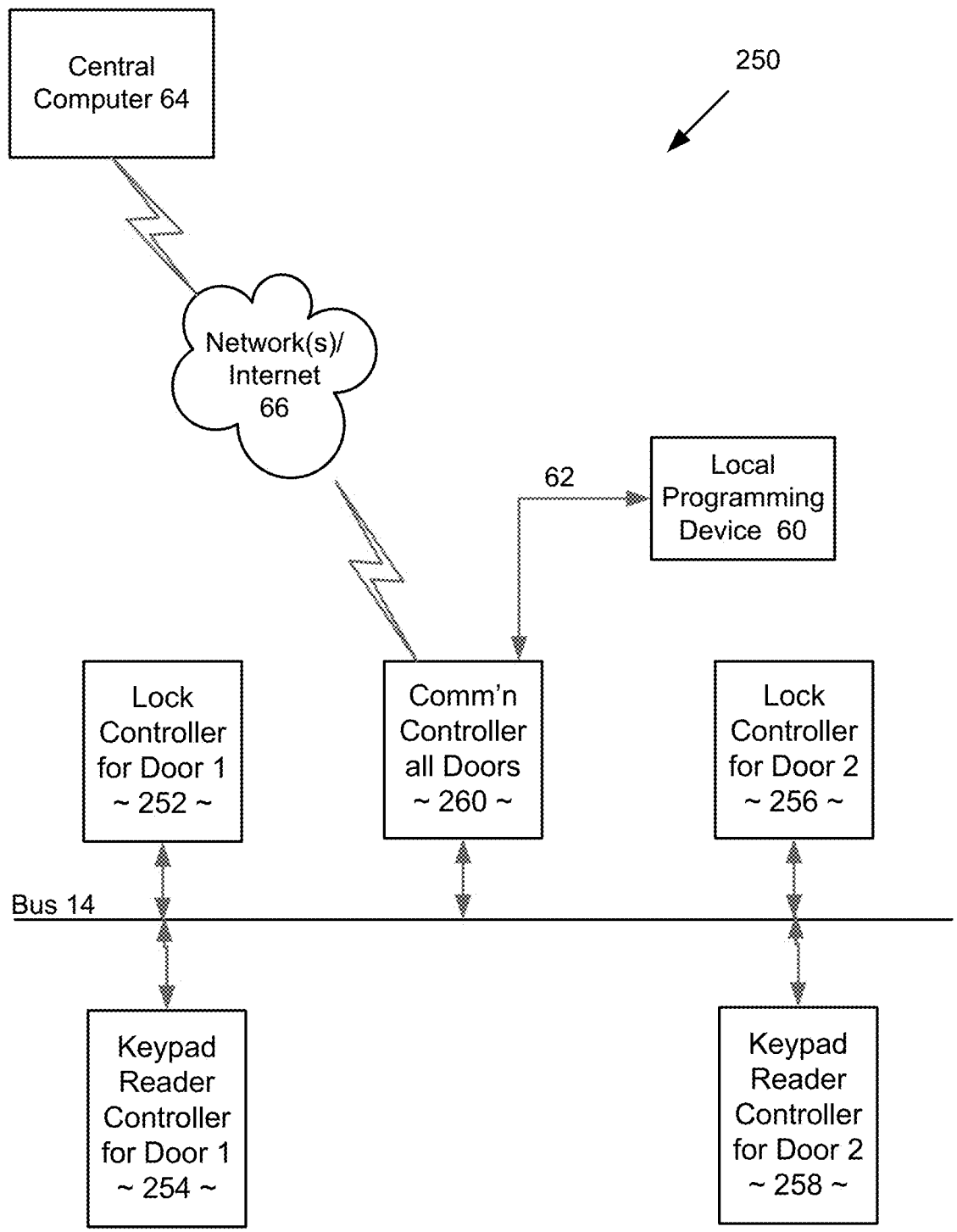
FIG. 8 is a schematic block diagram of another exemplary system including dynamically assignment of unique identifiers for devices on a bus.

In alternate exemplary embodiments, or in these embodiments, the filter logic 86 causes the causes one or more of the devices 12a-12n (and perhaps the control unit 50) to filter using the rest of the bus bits being used by the identified other devices for a purpose other than for the defined purpose (repurposed bits). For example, in exemplary embodiments, one or more of the devices 12a-12n (and perhaps the control unit 50) use some or all of the repurposed bits to indicate the target recipient of particular messages. FIG. 8 shows an exemplary 2-door electronic access control (EAC) system 250 having a lock controller for Door 1 252, a keypad-reader controller for Door 1 254, a lock controller for Door 2 256, a keypad-reader controller for Door 2 258, a communication controller 260 for both doors in communication with a local programming device 60 and a central computer 64, discussed above. In a situation when the central computer 64 determines whether to open a door in response to a number being typed into a keypad (not shown) connected to keypad-reader controller for Door 1 254 or keypad-reader controller for Door 2 258, there are several messages sent on the bus 14 that can be ignored (i.e., filtered) by other devices on the bus 14. For example, if an RFID card is read by the keypad-reader controller for Door 1 254, it will transmit on the bus a message including some or all of the contents of the data read by the keypad-reader controller for Door 1 254 intended for the communication controller 260 (and addressing it to the communication controller 260 using the repurposed bits) to send to the central computer via the network(s)/Internet 66. Thus, the lock controller for Door 1 252, the lock controller for Door 2 256, and the keypad-reader controller for Door 2 258 can all ignore (filter out) that message intended for the communication controller 260. Similarly, when the central computer 64 responds by sending an unlock instruction for Door 1 to the communication controller 260, there are many opportunities for filtering. The communication controller 260 transmits on the bus 14 that unlock instruction for Door 1, intending the message for the lock controller for Door 1 252 (and addressing it to the lock controller for Door 1 252 using the repurposed bits). Using the principles herein, the keypad-reader controller for Door 1 254, the lock controller for Door 2 256, and the keypad-reader controller for Door 2 258 can all ignore (filter out) that message intended for the lock controller for Door 1 252. Thus, in exemplary embodiments, the filter logic 86 in one or more of the devices 12a-12n (and perhaps the control unit 50) filter transmissions on the bus using recipient address bits in bus messages sent by the other devices.

Thus, in exemplary embodiments, one or more of the devices 12a-12n (and perhaps the control unit 50) have a dynamically-assigned unique identifier that has been communicated to at least some of the identified other devices on the bus; some of the repurposed bits are used as recipient address bits transmitted on the bus in place of some of the bus bits; and their respective processors are programmed to filter transmissions on the bus based on a comparison of received recipient address bits in a bus message sent by another device to the dynamically-assigned unique identifier of the processor-based device. An exemplary method of filtering based on the repurposed bits used as a message target device includes: (a) receiving at least the repurposed bits of a message, (b) comparing the repurposed bits for that message to the dynamically-assigned unique identifier of the processor-based device, and (c) taking a filtering action based on the comparison in part (b). As with the filtering based on identifiers, discussed above, different filter actions are contemplated, e.g., one or more of the following when the transmission on the bus 14 can be ignored: putting some of the circuitry of that device into a lower power mode, putting the processor 42 of that device into a lower power mode, ceasing to receive bits of that message before the end of that message; and/or putting a bus transceiver circuit 46 for that device into a lower power mode.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, a single device added to the bus 14 can have a dynamically-assigned unique identifier assigned without having to dynamically assign unique identifiers for all the devices on the bus as follows: an engineer or technician installs the new device, couples the local programming device 60 to that newly installed device, and causes with the programming device 60 the new device to transmit a message that both (1) requests a dynamically-assigned unique identifier and transmits the information in an Identity_Msg. In response, the device that acted as control unit to assign all the dynamically-assigned unique identifiers last time assigns only the new device a dynamically-assigned unique identifier with a special Assignment_Msg. Additionally, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

What is claimed is:

1. A processor-based device, comprising: a processor in communication with a plurality of other devices on a bus, the bus having a protocol using a plurality of bus bits used in accordance with the protocol for a defined purpose: and wherein the processor is programmed to:
transmit a discovery mode message on the bus to cause the other devices on the bus to cease independent transmissions on the bus during a discovery mode;
automatically identify at least a subject of the other devices on the bus while in the discovery mode;
automatically assign to each of the identified other devices on the bus a dynamically-assigned unique identifier using fewer bits than the number of bus bits, to be used by the identified other devices to replace a subject of the bus bits, thereby permitting the rest of the bus bits to be used by the identified other devices for a purpose other than for the defined purpose, and
automatically transmit at least one assignment message on the bus transmitting to each of the identified other devices on the bus its respective dynamically-assigned unique identifier to use as dynamically-assigned transmitter identity bits in place of some of the bus bits; and
wherein the processor is programmed to transmit, after transmitting the at least one assignment message, at least one resumption message on the bus to cause the other devices on the bus to resume independent transmissions on the bus using their respective dynamically-assigned unique identifier as dynamically-assigned transmitter identity bits in place of some of the bus bits; and
wherein the defined purpose of the bus bits comprises address bits of a device transmitting a message and wherein using at least some of the rest of the bus bits for a purpose other than the defined purpose comprises using at least some of the rest of the bus bits as address bits of an intended recipient of a message.

2. The processor-based device according to claim 1, wherein the address bits of an intended recipient of a message comprise dynamically-assigned identity bits and wherein a bus interface circuit in the processor-based device receives and filters transmissions on the bus when its respective dynamically-assigned identity bits in a message indicate that the processor-based device is the intended recipient of the message.

3. The processor-based device according to claim 2, wherein the processor is awakened or powered up by the bus interface circuit to process a message when the bus interface circuit determines that its respective dynamically-assigned identity bits in a message indicate that the processor-based device is the intended recipient of the message.

4. The processor-based device according to claim 1, wherein the processor is programmed to resume independent transmissions using its respective dynamically-assigned unique identifier.

5. The processor-based device according to claim 1, wherein the processor is in communication with the plurality of other devices on the bus via a local bus interface circuit proximate the processor and further wherein the bus directly electrically connects or directly optically connects the processor-based device and the plurality of other devices on the bus.

6. The processor-based device according to claim 1, wherein the processor-based device is one of the devices on the bus and a programming device temporarily connected to the processor-based device via a port causes the assignment of the dynamically-assigned unique identifiers to the devices on the bus and usage of the dynamically-assigned unique identifiers by the devices on the bus.

7. A processor-based device according to claim 1, wherein the processor-based device is a programming device temporarily connected to the bus to cause the assignment of the dynamically-assigned unique identifiers tot he devices on the bus and usage of the dynamically-assigned unique identifiers by the devices on the bus.

8. A processor-based device, comprising: a processor in communication with a plurality of other devices on a bus, the bus having a protocol using a plurality of bus bits used in accordance with the protocol for a defined purpose: and wherein the processor is programmed to:
transmit a discovery mode message on the bus to cause the other devices on the bus to cease independent transmissions on the bus during a discovery mode;
automatically identify at least a subset of the other devices on the bus while in the discovery mode;
automatically assign to each of the identified other devices on the bus a dynamically-assigned unique identifier using fewer bits than the number of bus bits, to used by the identified other devices to replace a subset of the bus bits, thereby permitting the rest of the bus bits to be used by the identified other devices for a purpose other than for the defined purpose; and automatically transmit at least one assignment message on the bus transmitting to each of the identified other devices on the bus its respective dynamically-assigned unique identifier to use a dynamically-assigned transmitter identity bits in place of some of the bus bits; and wherein the processor is programmed to transmit, after transmitting the at least one assignment message, at least one resumption message on the bus to cause the other devices on the bus to resume independent transmissions on the bus using their respective dynamically-assigned unique identifier as dynamically-assigned transmitter identity bits in place of some of the bus bits; and wherein the processor-based device has logic that filters transmissions on the bus using some of the rest of the bus bits being used by the identified other devices for a purpose other than for the defined purpose (repurposed bits).

9. The processor-based device according to claim 8, (a) wherein some of the repurposed bits are used as recipient address bits transmitted on the bus in place of some of the bus bits; and (b) wherein the processor-based device has logic that filters transmissions on the bus using recipient address bits in bus messages sent by the other devices.

10. The processor-based device according to claim 8, wherein the processor-based device has a dynamically-assigned unique identifier that has been communicated to at least some of the identified other devices on the bus;

wherein some of the repurposed bits are used as recipient address bits transmitted on the bus in place of some of the bus bits; and wherein the processor-based device has logic that filters transmissions on the bus based on a comparison of received recipient address bits in a bus message sent by another device to the dynamically-assigned unique identifier of the processor-based device.

11. The processor-based device according to claim 8, wherein some of the repurposed bits are used as recipient address bits transmitted on the bus in place of some of the bus bits and wherein a bus interface circuit in the processor-based device receives and filters transmissions on the bus when its respective recipient address bits in a message indicate that the processor-based device is the intended recipient of the message.

12. The processor-based device according to claim 11, wherein the processor is awakened or powered up by the bus interface circuit to process a message when the bus interface circuit determines that its respective recipient address bits in a message indicate that the processor-based device is the intended recipient of the message.

13. A processor-based device, comprising: a processor in communication with a plurality of other devices on a bus, the bus having a protocol using a plurality of bus bits used in accordance with the protocol for a defined purpose; and wherein the processor is programmed to:

transmit a discovery mode message on the bus to cause the other devices on the bus to cease independent transmissions on the bus during a discovery mode;

automatically identify at least a subset of the other devices on the bus while in the discovery mode;

automatically assign to each of the identified other devices on the bus a dynamically-assigned unique identifier using fewer bits than the number of bus bits, to be used by the identified other devices to replace a subset of the bus bits, thereby permitting the rest of the bus bits to be used by the identified other devices for a purpose other than for the defined purpose; and automatically transmit at least one assignment message on the bus transmitting to each of the identified other devices on the bus its respective dynamically-assigned unique identifier to use as dynamically-assigned transmitter identity bits in place of some of the bus bits; and wherein the bus has a protocol using a plurality of arbitration bits to arbitrate communication on the bus, wherein the bus bits are arbitration bits used for the defined purpose of arbitrating communication on the bus, wherein the arbitration bits are other than manually assigned bits uniquely identifying the other devices on the bus, and wherein the processor is programmed to automatically assign to each of the identified other devices on the bus the dynamically-assigned unique identifier using fewer bits than the number of arbitration bits, to be used by the identified other devices to replace a subset of the arbitration bits, thereby permitting the rest of the arbitration bits to be used by the identified other devices for a purpose other than for arbitrating communication on the bus (repurposed bits).

14. The processor-based device according to claim 13, wherein the processor is in communication with the plurality of other devices on the bus via a local bus interface circuit proximate the processor and further wherein the bus directly electrically connects or directly optically connects the processor-based device and the plurality of other devices on the bus.

15. The processor-based device according to claim 13, wherein some of the repurposed bits are used as recipient address bits transmitted on the bus in place of some of the bus bits and wherein a bus interface circuit in the processor-based device receives and filters transmissions on the bus when its respective recipient address bits in a message indicate that the processor-based device is the intended recipient of the message.

16. The processor-based device according to claim 15, wherein the processor is awakened or powered up by the bus interface circuit to process a message when the bus interface circuit determines that its respective recipient address bits in a message indicate that the processor-based device is the intended recipient of the message.

17. A method, comprising:

transmitting a discovery mode message on a bus to cause a plurality of devices on a bus to cease independent transmissions on the bus during a discovery mode, the bus having a protocol using a plurality of bus bits used in accordance with the protocol for a defined purpose;

automatically identifying at least a subject of the other devices on the bus while in the discovery mode;

automatically assigning to each of the identified other devices on the bus a dynamically-assigned unique identifier using fewer bits than the number of bus bits, to be used by the identified other devices to replace a subset of the bus bits, thereby permitting the rest of the bus bits to be used by the identified other devices for a purpose other than for the defined purpose; and automatically transmitting at least one assignment message on the bus transmitting to each of the identified other devices on the bus its respective dynamically-assigned unique identifier to use as dynamically-assigned transmitter identity bits in place of some of the bus bits; and further comprising transmitting, after transmitting the at least one assignment message, at least one resumption message on the bus to cause devices on the bus to resume independent transmissions on the bus using their respective dynamically-assigned unique identifier as dynamically-assigned transmitter identity bits in place of some of the bus bits; and further comprising receiving and filtering transmissions on the bus based on whether dynamically-assigned identity bits in a message indicate that a device is the intended recipient of the message.

18. The method according to claim 17, further comprising waking or powering up a processor when its respective dynamically-assigned identity bits in a message indicate that a device with the processor is the intended recipient of the message.

19. The method according to claim 17, further comprising physically installing a new device, connecting power to the new device, connecting the new device to the bus, causing the assignment of the dynamically-assigned unique identifiers to the devices on the bus, including the new device, and causing the devices on the bus to use the dynamically-assigned unique identifiers in bus messages.

* * * * *